US006971166B2

(12) United States Patent
Makino et al.

(10) Patent No.: US 6,971,166 B2
(45) Date of Patent: Dec. 6, 2005

(54) METHOD OF MANUFACTURING A NONRECIPROCAL DEVICE

(75) Inventors: Toshihiro Makino, Matto (JP); Hiroki Dejima, Kanazawa (JP); Takashi Kawanami, Ishikawa-gun (JP); Takashi Hasegawa, Kanazawa (JP); Masakatsu Mori, Ishikawa-gun (JP); Takahiro Jodo, Ishikawa-gun (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 452 days.

(21) Appl. No.: 10/156,318

(22) Filed: May 24, 2002

(65) Prior Publication Data

US 2002/0140517 A1 Oct. 3, 2002

Related U.S. Application Data

(62) Division of application No. 09/608,157, filed on Jun. 30, 2000, now Pat. No. 6,469,588.

(30) Foreign Application Priority Data

Jul. 2, 1999 (JP) ................................ 11-188799

(51) Int. Cl.[7] .......................... H01K 3/22; B29D 11/00

(52) U.S. Cl. ......................... 29/848; 29/602.1; 29/607; 29/858; 264/1.7; 264/478; 438/106; 438/107; 438/112

(58) Field of Search ........................... 29/848, 890.127, 29/602.1, 607, 858; 264/1.7, 478; 438/106, 438/107, 112

(56) References Cited

U.S. PATENT DOCUMENTS

| | | | | |
|---|---|---|---|---|
| 4,470,131 A * | 9/1984 | Hatayama et al. | ............. | 365/2 |
| 4,812,787 A * | 3/1989 | Kuramoto et al. | ........... | 333/1.1 |
| 5,144,745 A * | 9/1992 | Yoshimura et al. | ........ | 29/602.1 |
| 5,159,294 A * | 10/1992 | Ishikawa et al. | ............. | 333/1.1 |
| 5,459,439 A * | 10/1995 | Marusawa et al. | ........... | 333/1.1 |
| 5,559,372 A * | 9/1996 | Kwon | ........................ | 257/692 |
| 5,745,015 A * | 4/1998 | Tokudera et al. | ............ | 333/1.1 |
| 5,928,598 A * | 7/1999 | Anderson et al. | ........... | 264/446 |
| 6,060,958 A * | 5/2000 | Tokudera et al. | ............ | 333/1.1 |
| 6,625,869 B2 * | 9/2003 | Jodo | ......................... | 29/602.1 |
| 6,674,354 B2 * | 1/2004 | Hasegawa | ................... | 336/200 |

FOREIGN PATENT DOCUMENTS

| | | |
|---|---|---|
| JP | 2-057534 | 4/1990 |

(Continued)

OTHER PUBLICATIONS

Kumiko Sato, Japanese Patent Opposition Statement, Jun. 9, 2003, pp. 1-34.*

(Continued)

*Primary Examiner*—A. Dexter Tugbang
*Assistant Examiner*—Terri Lynn Smith
(74) *Attorney, Agent, or Firm*—Keating & Bennett, LLP

(57) ABSTRACT

A method of manufacturing a non-reciprocal component including a casing having an input/output terminal and a ground terminal formed therein, a ferrite plate, a line conductor, and a magnet disposed in the casing, and an upper yoke and a lower yoke provided at the top face and the bottom face of the casing, respectively. In the non-reciprocal component, the casing is insert-molded with the lower yoke so that a portion of the casing penetrates through the lower yoke. A side of the component is defined partly by the lower yoke and partly by the penetrating portion of the casing. An input/output terminal and a ground terminal in the casing are defined by respective portions of a molded hoop material.

11 Claims, 10 Drawing Sheets

FOREIGN PATENT DOCUMENTS

| | | |
|---|---|---|
| JP | 6-164212 | 6/1994 |
| JP | 8-008610 | 1/1996 |
| JP | 8-046409 | 2/1996 |
| JP | 2-501715 | 4/1996 |
| JP | 9-055607 | 2/1997 |
| JP | 9-063416 | 3/1997 |
| JP | 9-321504 | 12/1997 |
| JP | 10-041706 | 2/1998 |
| JP | 10-107511 | 4/1998 |
| JP | 10-135711 | 5/1998 |
| JP | 10-290140 | 10/1998 |
| JP | 11-068411 | 3/1999 |

OTHER PUBLICATIONS

Masataka Kataoka, Japanese Opposition Statement 2003-71491, Jul. 18, 2003, pp. 1-36.*

* cited by examiner

METHOD OF MANUFACTURING A NONRECIPROCAL DEVICE

CROSS REFERENCE TO RELATED APPLICATIONS

This is a division of U.S. patent application Ser. No. 09/608,157, filed Jun. 30, 2000 now U.S. Pat. No. 6,469,588 in the name of Toshihiro MAKINO, Hiroki DEJIMA, Takashi KAWANAMI, Takashi HASEGAWA, Masakatsu MORI AND Takahiro JODO and entitled NONRECIPROCAL DEVICE AND COMMUNICATION DEVICE USING THE SAME.

BACKGROUND OF THE INVENTION

1. Field of the Invention

The present invention relates to a non-reciprocal component, such as a circulator or an isolator, used in a microwave band or the like, and to a communication device using the same.

2. Description of the Related Art

The construction of a conventional lumped-constant isolator used in a microwave band or the like is shown as an exploded perspective view thereof in FIG. 14.

A casing 1 is a box resin casing, which is open at the top face thereof as observed in FIG. 14. Various terminals are provided in this casing 1. In the condition shown in this figure, one input/output (I/O) terminal 2*a* and ground terminals 3 appear, and an exposed part of another I10 terminal 2*b* appears inside the casing 1. A lower yoke 9 is mounted on the casing 1. Inside the casing 1, capacitors 7*a*, 7*b*, and 7*c*, a chip resistor 8, a ferrite plate 5, line conductors 4*a*, 4*b*, 4*c*, and a magnet 6 are placed in this order. An upper yoke 10 covers the top face of the casing 1.

However, such a conventional isolator has a problem in that when the casing 1 and the lower yoke 9 are assembled by soldering the lower yoke 9 to terminals provided in the casing 1, since a sufficient soldered area thereof cannot be obtained, adequate bonding strength cannot be secured. This may lead to a reduction in reliability of an electronic device. For example, an impact from dropping causes the soldered parts of the electronic device to come off. Furthermore, when the lower yoke 7 and the casing 1 are soldered, there is a risk that since the I/O terminals 2*a* and 2*b* and the ground terminals 3 do not form the same plane due to mismatching between the sizes of components on the lower yoke 9 and the sizes of components on the casing 1, some of the terminals may be raised. As a result, when characteristics of this isolator are to be measured, there is a problem in that measurement cannot be performed because terminals of a measuring jig are not properly connected to the I/O terminals 2*a* and 2*b* or ground terminals 3.

Furthermore, since various terminals provided in the casing 1 and the lower yoke 9 are always provided as discrete components, there is a problem in that reduction of cost cannot be obtained due to reduction of the number of components.

SUMMARY OF THE INVENTION

It is an object of the present invention to provide a non-reciprocal component in which the foregoing problems are solved, shock resistance and dimensional accuracy of terminal parts are enhanced, and reduction of cost is easily achieved, and a communication device using the same.

To this end, according to a first aspect of the present invention, there is provided a non-reciprocal component that includes a casing having an I/O terminal and a ground terminal formed therein; a ferrite plate, a transmission line conductor, and a magnet stored in the casing; and an upper yoke and a lower yoke provided at the top face and the bottom face of the casing, respectively. In the non-reciprocal component, the casing is insert-molded with the lower yoke.

This construction allows sufficient shock resistance to be secured. In addition, since there is no need to solder the lower yoke to the terminals provided in the casing, dimensional accuracy of the positions of the terminals is increased.

In this non-reciprocal component, the lower yoke, the I/O terminal, and the ground terminal may be formed by molding a hoop material. This construction enables the lower yoke and the casing to be insert-molded in succession, and the lower yoke, the I/O terminal, and the ground terminal to be formed using the same material. Accordingly, the number of parts can be reduced.

In the non-reciprocal component, a portion of the lower yoke may be exposed as the ground terminal from the casing. This construction allows the distance between the ground terminal and the lower yoke to be minimized, which minimizes residual inductance.

In the non-reciprocal component, alternatively, the ground terminal is protruded outside the lower yoke, and the ground terminal has a solder resist film formed at the base thereof. Because of this, when mounting is performed on a circuit substrate of an electronic device, solder is prevented from flowing into the bottom face of the lower yoke, which enables soldering to be performed only on terminal parts.

In the non-reciprocal component, the thickness of the lower yoke, the thickness of the I/O terminal, and the thickness of the ground terminal are 0.3 mm or less.

According to a second aspect of the present invention, a communication device is provided with a non-reciprocal component according to the first aspect of the present invention. For example, the communication device is constructed by providing the non-reciprocal component as a circulator in which a transmission signal and a reception signal are branched.

DESCRIPTION OF THE PREFERRED EMBODIMENTS

The construction of an isolator according to a first embodiment of the present invention is described with reference to FIGS. 1 to 5.

Figure 1:
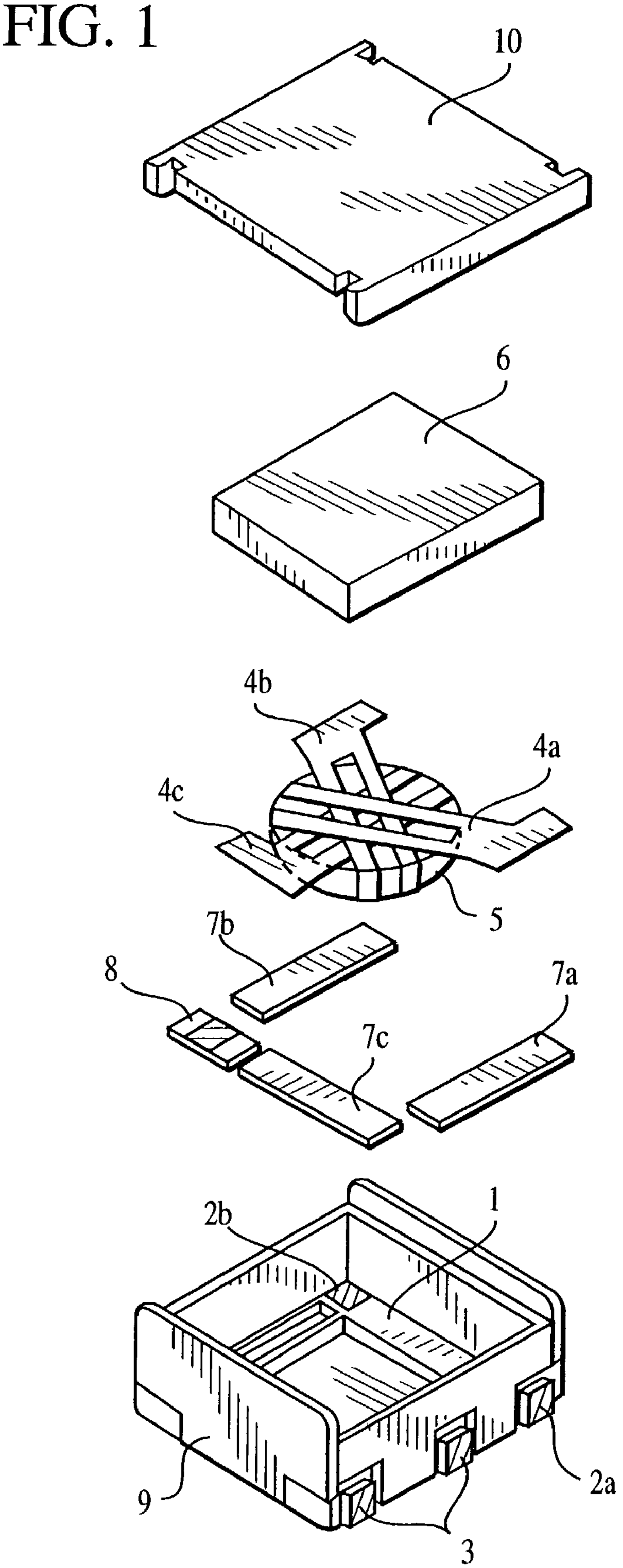
FIG. 1 is an exploded perspective view of an isolator according to a first embodiment.

FIG. 1 is an exploded perspective view of the isolator. The isolator is constructed as follows. A resin casing 1 is insert-molded along with a lower yoke 9 made of a magnetic material, I/O terminals 2*a* and 2*b*, and ground terminals 3. The ground terminals 3 are integrated with the lower yoke 9, and the I/O terminals 2*a* and 2*b* are insulated from the lower yoke 9. Inner ends of the two I/O terminals 2*a* and 2*b* are exposed at the inner bottom face of the casing 1. Capacitors 7*a*, 7*b*, and 7*c*, and a chip resistor 8 are disposed in the casing. The top faces and the bottom faces of the capacitors 7*a*, 7*b*, and 7*c*, and the chip resistor 8, as observed in the figure, serve as electrode faces. Transmission line conductors (central conductors) 4*a*, 4*b*, and 4*c*, a ferrite plate 5, and a magnet 6 are stored in the casing 1 so that the line conductors 4*a*, 4*b*, and 4*c* are held between the ferrite plate 5 and the magnet 6. Finally, an upper yoke 10 made of a magnetic material covers an opening of the casing 1.

Figure 2A:
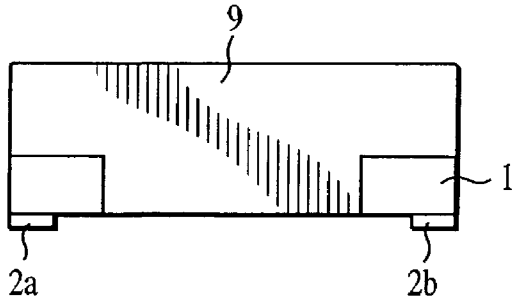
FIGS. 2A to 2C are three views of the isolator.
Figure 2C:
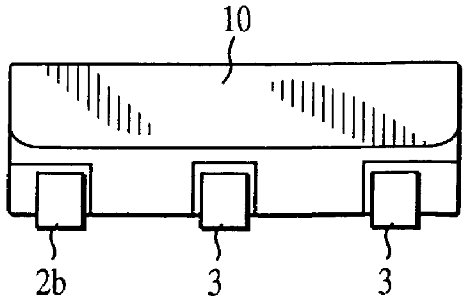
Figure 2B:
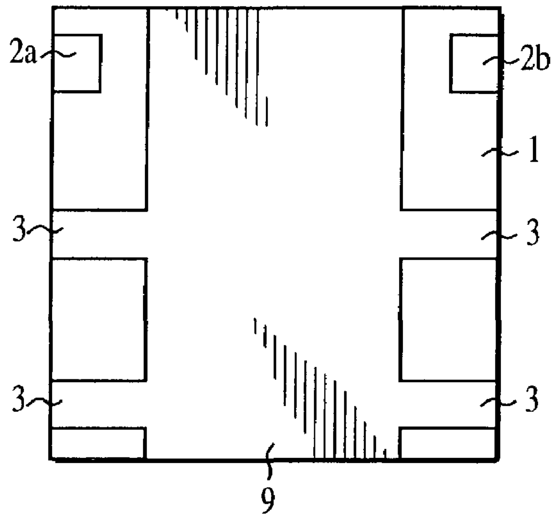

FIGS. 2A, 2B and 2C show three views of the above-described isolator; FIG. 2A is a front view thereof; FIG. 2B is a bottom view thereof; and FIG. 2C is a right-side view thereof. Parts of the lower yoke 9 are extended as the four ground terminals 3, and the casing 1 is insert-molded along with the ground terminals 3 and the I/O terminals 2*a* and 2*b*. In this manner, by insert-molding the casing 1 along with the lower yoke 9, there is no need to solder the lower yoke 9 to the terminals provided in the casing 1. Accordingly, shock resistance is enhanced. In addition, the positional accuracy (planar accuracy) of the I/O terminals 2*a* and 2*b* and the ground terminals 3 is improved. Therefore, when isolator characteristics are measured, connection failure between a measuring jig and the isolator can be prevented. When the isolator is mounted on a mounting substrate, raising of the terminals can be avoided.

Figure 3:
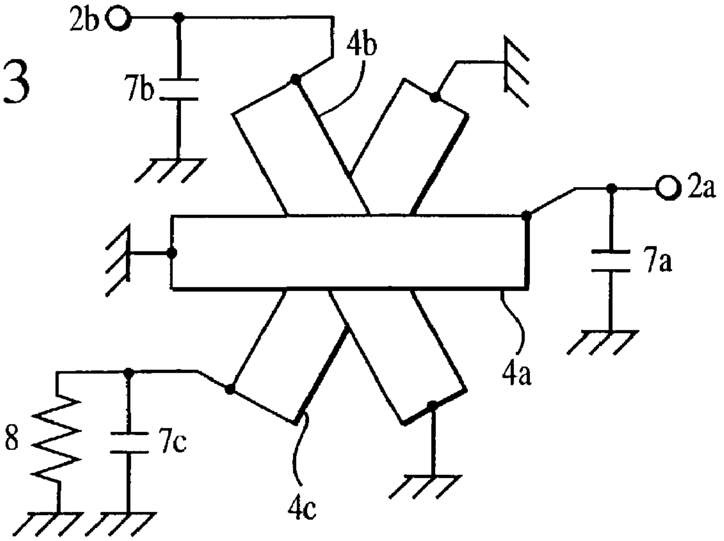
FIG. 3 is a circuit diagram of the isolator.

FIG. 3 is a circuit diagram of the above-described isolator. The circuit of the I/O terminals 2*a* and 2*b* is constructed as follows. The line conductors 4*a*, 4*b*, and 4*c* cross one another so as to establish a mesh connection. One end of each of the line conductors is grounded, while the other end thereof and the ground have matching capacitors 7*a*, 7*b*, and 7*c* inserted therebetween. The chip resistor 8 is connected as a termination resistor between the non-grounded terminal of the line conductor 4*c* and the ground. Because of this construction, non-reciprocal property can be obtained between the I/O terminals 2*a* and 2*b*. For example, a signal passes from the I/O terminal 2*a* to the I/O terminal 2*b* with low reflection, whereas a signal that is input to the I/O terminal 2*b* is hardly output from the I/O terminal 2*a* due to attenuation in the resistor 8.

Figure 4:
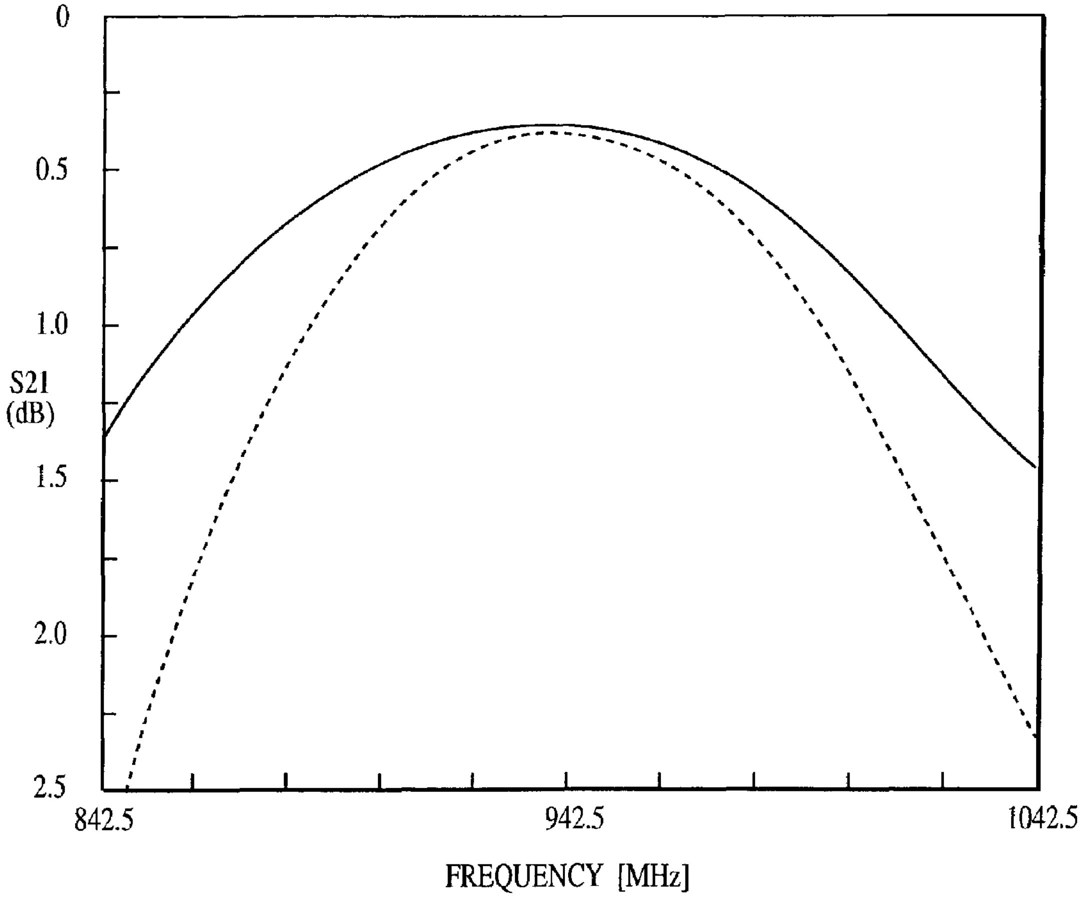
FIG. 4 is a graph showing frequency characteristics of the insertion loss of the isolator in a narrow frequency band.
Figure 5:
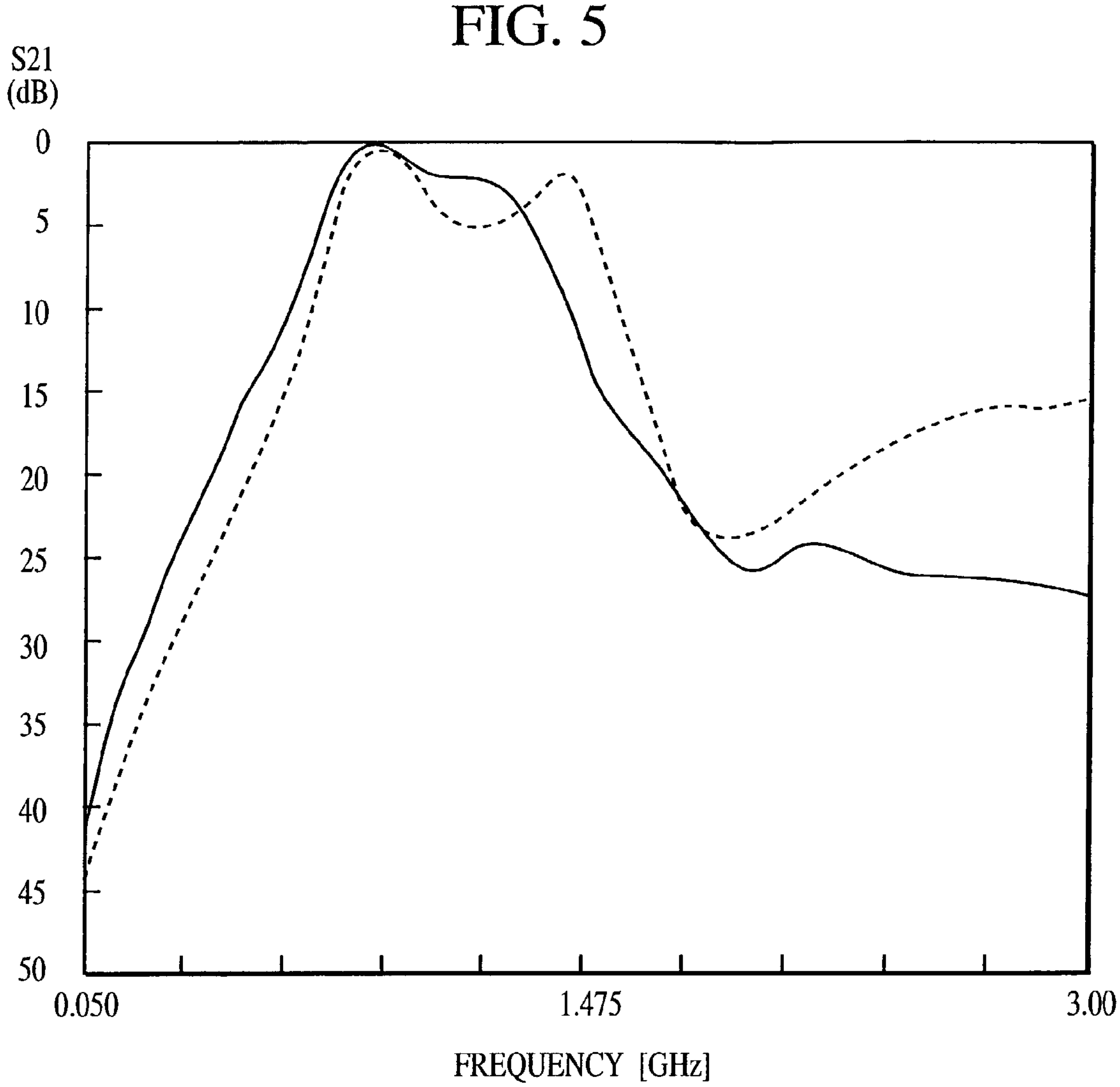
FIG. 5 is a graph showing frequency characteristics of the insertion loss of the isolator in a wide frequency band.

FIGS. 4 and 5 show frequency characteristics of the insertion loss of the isolator. In both figures, the solid lines represent characteristics of the isolator according to this embodiment of the present invention, and, for comparison, the dashed-lines represent those of an isolator having a conventional construction. In this first embodiment, since the ground terminals 3 are provided as integrally formed portions of the lower yoke 9, the lengths of the ground terminals are minimized, and residual inductance is maintained small, which improves the ground circuit. Consequently, as shown in FIG. 4, low loss is realized and the bandwidth of a characteristic band in which the isolator can be operative is expanded. In addition, since unnecessary radiation decreases, a large amount of attenuation can be obtained in a high frequency region, as shown in FIG. 5.

Furthermore, since the ground terminals 3 are provided as integral parts of the lower yoke 9, heat that is generated at the chip resistor 8 functioning as a terminator flows into a ground plane of the mounting substrate via the lower yoke 9 functioning as a ground plate and the ground terminals. Accordingly, heat radiation is improved and electrical power resistant of the isolator is enhanced. Since the operating temperature of the isolator is maintained low due to the radiation, the reliability thereof is increased.

The construction of an isolator according to a second embodiment is described with reference to FIGS. 6A to 6C.

Figure 6A:
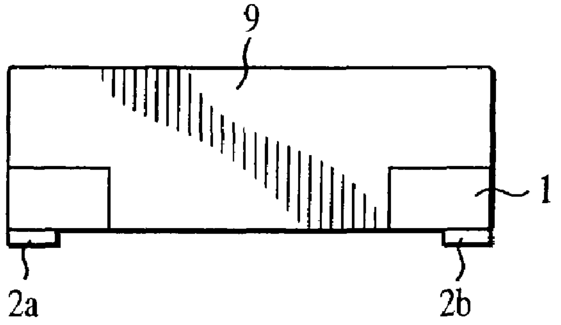
FIGS. 6A to 6C are three views of an isolator according to a second embodiment.
Figure 6C:
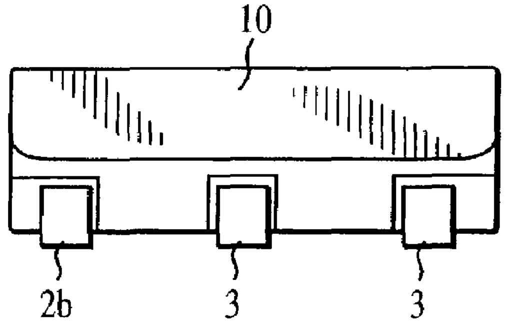
Figure 6B:
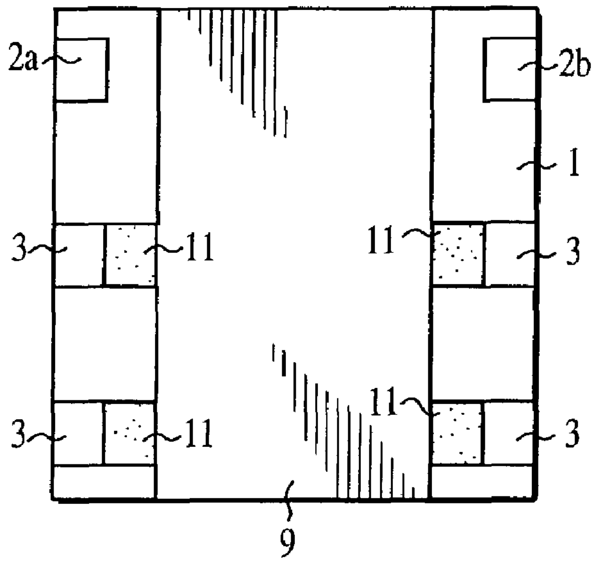

FIGS. 6A, 6B, and 6C show three views of the isolator; FIG. 6A is a front view thereof; FIG. 6B is a bottom view thereof; and FIG. 6C is a right-side view thereof. In this embodiment as well, the ground terminals 3 are formed one after another so as to be protruded outside the lower yoke 9. Solder resist films 11 are formed by printing or the like at the corresponding bases of these ground terminals apart from the actual operative regions thereof. The solder resist films 11 are formed at proximal ends of the ground terminals 3 exposed on an outer bottom surface of the isolator. Otherwise, the construction of the isolator is identical to that shown in the first embodiment. Therefore, since the solder resist films 11 are located on the bases of the ground terminals 3 extending from the lower yoke 9, when this isolator is mounted on a mounting substrate of an electronic device, solder does not flow into the inner bottom surface of the lower yoke 9 from the ground terminals 3. Accordingly, the I/O terminals 2*a* and 2*b* and the ground terminals 3 can be firmly soldered to the mounting substrate.

The construction of an isolator according to a third embodiment is described with reference to FIGS. 7A to 9C.

Figure 7A:
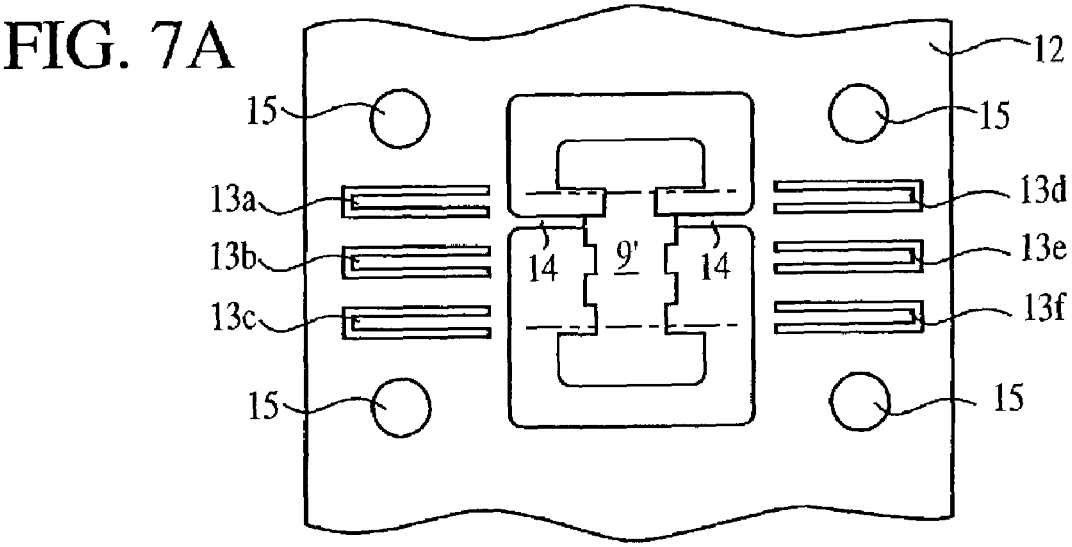
FIGS. 7A to 7C are illustrations showing manufacturing processes of an isolator according to a third embodiment.
Figure 7B:
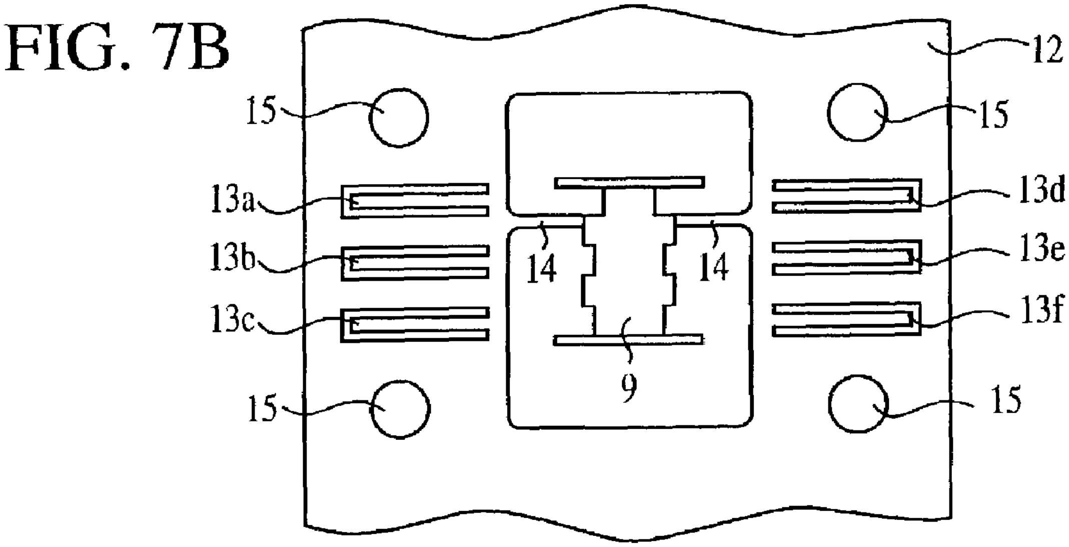
Figure 7C:
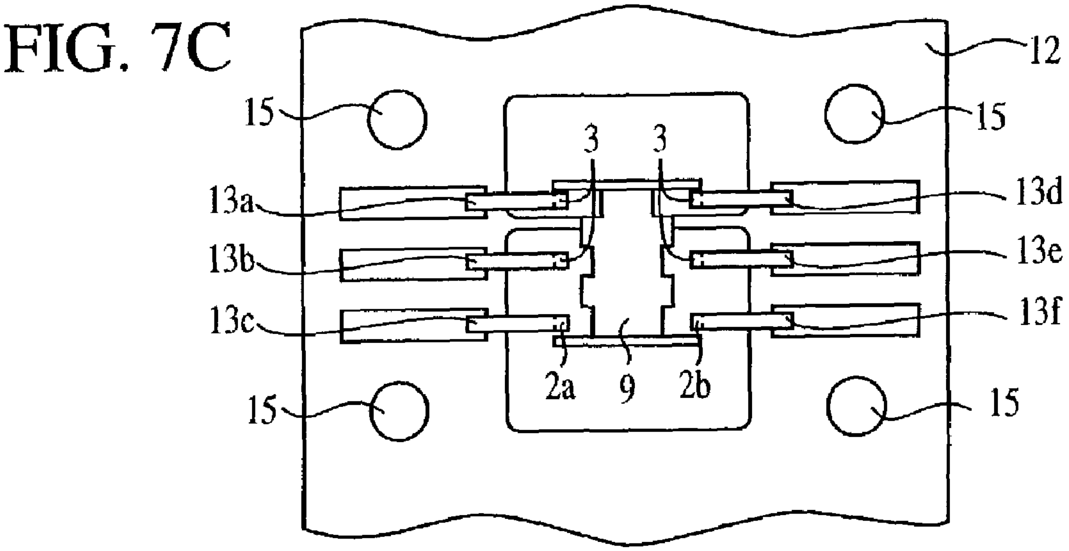

FIGS. 7A to 7C are illustrations of a process for forming the lower yoke 9 and each of the terminals thereof. In these figures, a hoop material 12 made of a magnetic material obtained by forming a plated film on an iron plate, such as Ag, Ni, Au, or Cu, having a thickness of 0.3 mm or less. Sprocket holes 15 are formed so that the hoop material 12 is fed along the longitudinal direction of the hoop material 12.

As shown in FIG. 7A, by applying die-cutting to a hoop material 12, a part 9' to later become the lower yoke 9 is molded while maintaining connection with the frame part of the hoop material 12 via connecting parts 14. At the same time, cut-and-raised pieces 13*a* to 13*f* are formed.

As shown in FIG. 7B, the lower yoke 9 is formed by folding the part 9' at the two-dot chain lines shown in FIG. 7A. However, up to this point, the lower yoke 9 still maintains connection with the hoop material 12 via the connecting parts 14.

As shown in FIG. 7C, by folding the cut-and-raised pieces 13*a* to 13*f* by approximately 180 degrees, the ends thereof are disposed so as to flank the lower yoke 9. These ends are to be used later as the I/O terminals 2*a* and 2*b*, and the ground terminals 3.

Since the thickness of the hoop material 12 is 0.3 mm or less, it is easy to fold the lower yoke 9 and to cut and raise the cut-and-raised pieces 13*a* to 13*f*.

Figure 8:
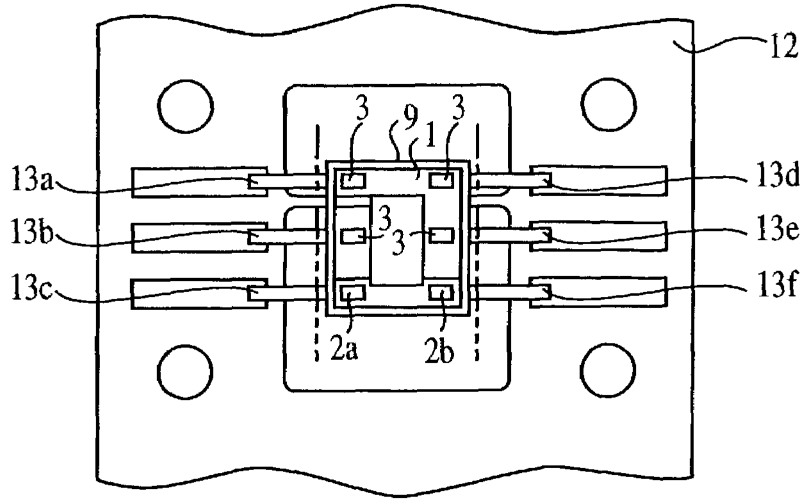
FIG. 8 is an illustration showing a state in which a casing is insert-molded along with a lower yoke and terminals.

FIG. 8 illustrates a process that follows the processes shown in FIGS. 7A to 7C. The casing 1 is insert-molded along with the lower yoke 9 and the cut-and-raised pieces 13*a* to 13*f*. At this time, ends of the cut-and-raised pieces 13*c* and 13*f* are exposed as inner terminals of the I/O terminals 2*a* and 2*b* at the inner bottom face of the casing 1. Ends of the other cut-and-raised pieces 13*a*, 13*b*, 13*d*, and 13*e* are exposed as inner terminals of the ground terminals 3 at the inner bottom face of the casing 1.

From the condition shown in FIG. 8, the cut-and-raised pieces 13*a* to 13*f* are cut off along the two-dot chain lines. Parts of the cut-and-raised pieces protruded from the sides of the casing 1 are folded, whereby the I/O terminals 2*a* and 2*b* and the ground terminals 3 are formed.

Figure 9A:
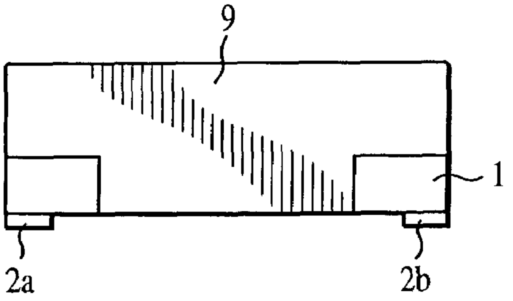
FIGS. 9A to 9C are three views of the isolator.
Figure 9C:
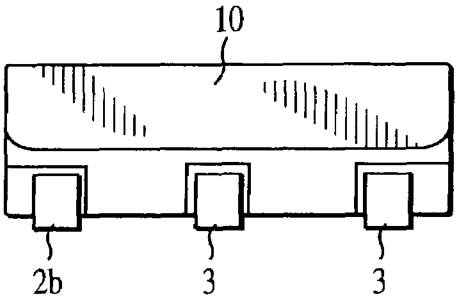
Figure 9B:
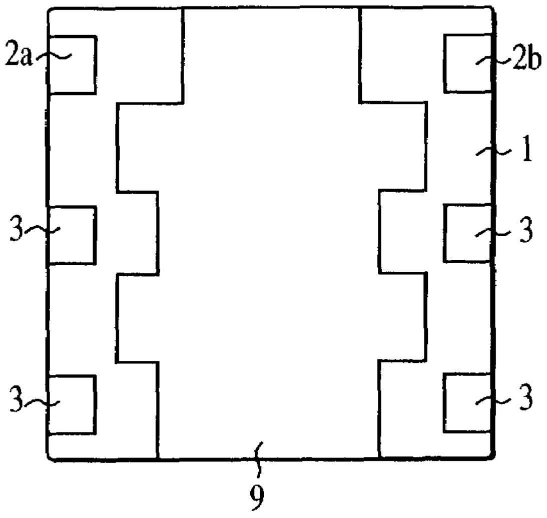

FIGS. 9A, 9B, and 9C show three views of the isolator; FIG. 9A is a front view thereof; FIG. 9B is a bottom view thereof; and FIG. 9C is a right-side view thereof. The I/O terminals 2*a* and 2*b*, and the ground terminals 3 are formed with the same materials as those of the lower yoke 9. In addition, they are insert-molded with the casing 1. Accordingly, shock resistance is enhanced, and the positional accuracy of the I/O terminals 2*a* and 2*b*, and the ground terminals 3 are also enhanced.

The construction of an isolator according to a fourth embodiment of the present invention is described with reference to FIGS. 10 to 11C.

Figure 10:
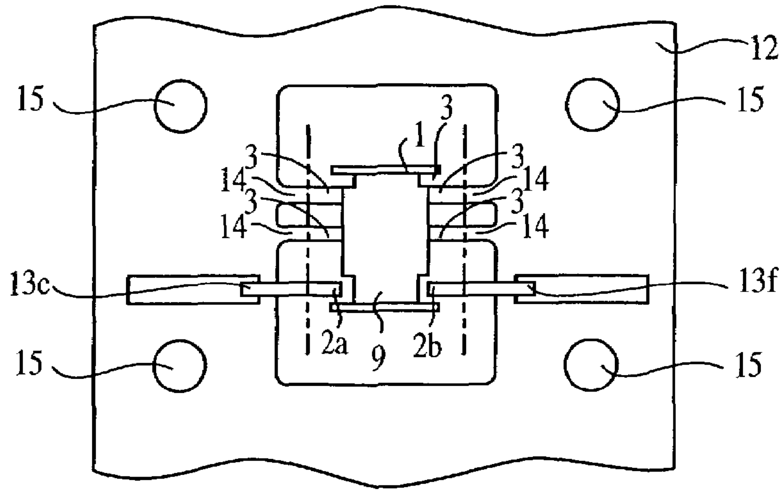
FIG. 10 is an illustration showing the construction of an isolator according to a fourth embodiment in a hoop material.

FIG. 10 shows the construction of the hoop material 12 before insert-mold formation of the casing 1. The lower yoke 9 made of the magnetic material establishes connection via the connecting parts 14 with frame parts of the hoop material 12 made of the magnetic material. The cut-and-raised pieces 13*c* and 13*f* are cut and raised from the hoop material 12 and are folded by approximately 180 degrees.

From the state shown in FIG. 10, a resin to be the casing 1 is insert-molded. Then, the connecting parts 14 and the cut-and-raised pieces 13*c* and 13*f* are cut off along the two-dot chain lines, and parts of the cut-and-raised pieces protruding from the sides of the casing 1 are folded, whereby the I/O terminals 2*a* and 2*b* and the ground terminals 3 are formed.

Figure 11A:
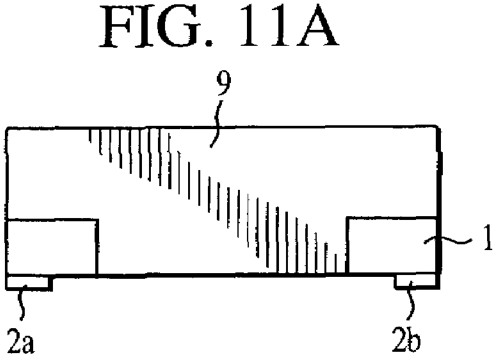
FIGS. 11A to 11C are three views of the isolator.
Figure 11C:
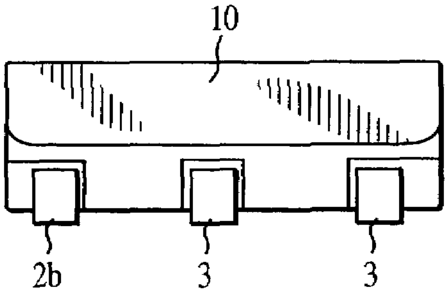
Figure 11B:
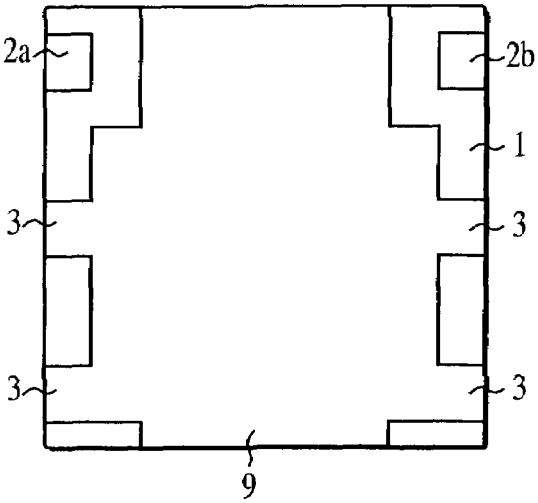

FIGS. 11A, 11B, and 11C show three views of the isolator constructed by the above-described processes; FIG. 11A is a front view thereof; FIG. 11B is a bottom view thereof; and FIG. 11C is a right-side view thereof. Connecting parts between the lower yoke 9 and the hoop material 12 can be simply used as ground terminals 3.

Figure 12A:
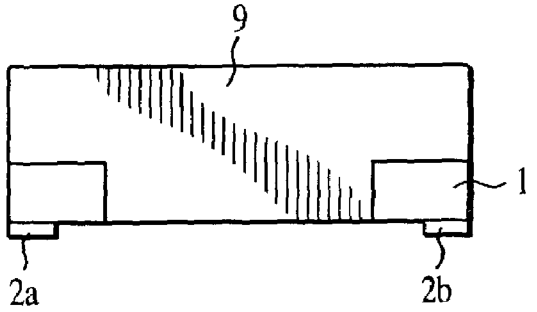
FIGS. 12A to 12C are three view of an isolator according to a fifth embodiment.
Figure 12C:
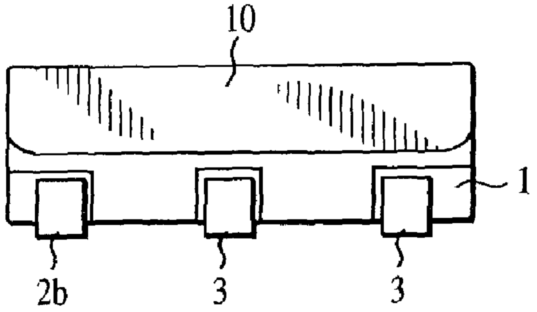
Figure 12B:
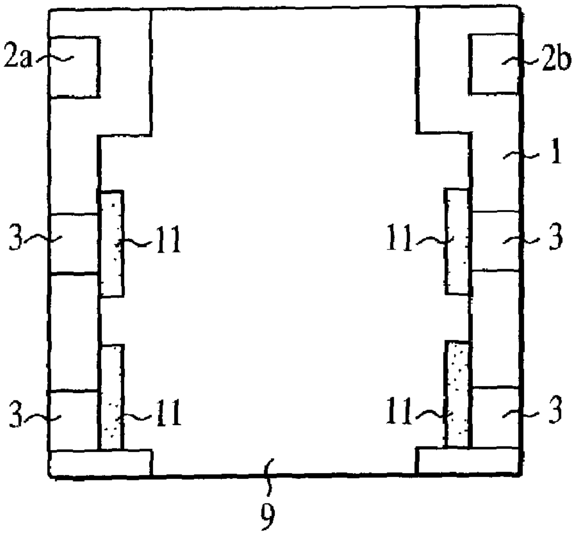

FIGS. 12A, 12B, and 12C show three views showing the construction of an isolator according to a fifth embodiment of the present invention. In FIGS. 12A to 12C, a solder resist films 11 are formed at the bases of the ground terminals 3. Otherwise, the construction of the isolator is identical to that of the isolator shown in FIG. 11. By forming the solder resist films 11 at the bases of the ground terminals 3, when this isolator is mounted on the mounting substrate of the electronic device, solder does not flow into the (inner) bottom face of the lower yoke 9 from the ground terminals 3. Accordingly, the I/O terminals 2*a* and 2*b*, and the ground terminals 3 are firmly soldered to the mounting substrate.

Figure 13:
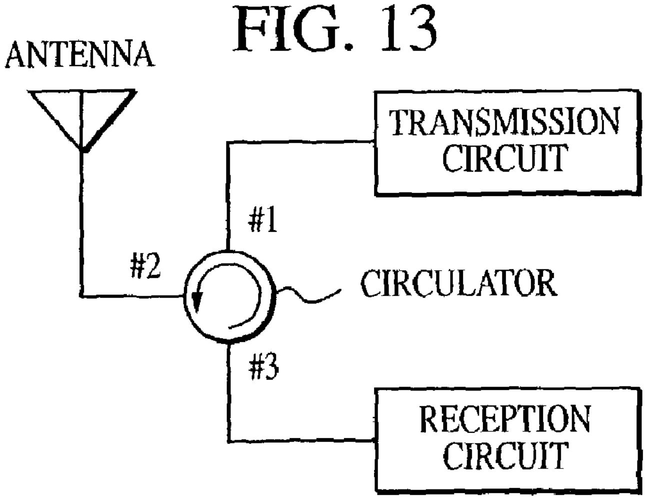
FIG. 13 is a block diagram showing the construction of a communication device according to a sixth embodiment.
Figure 14:
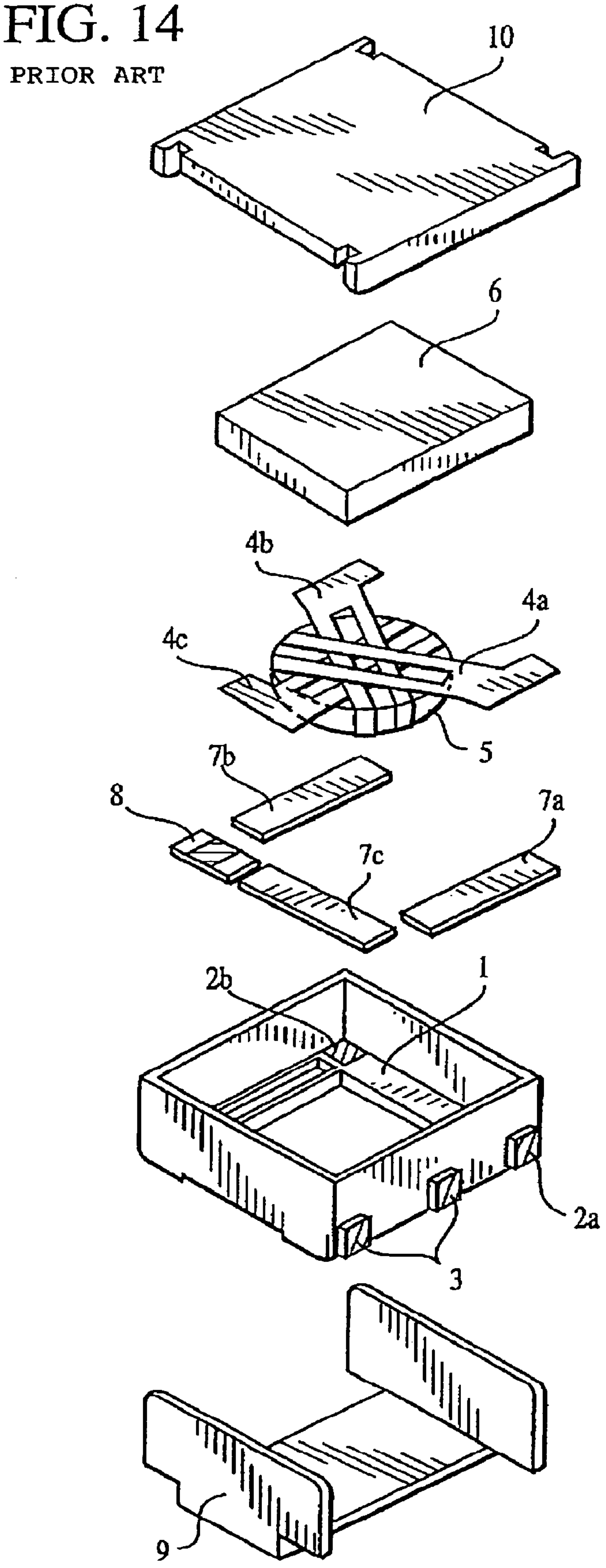
FIG. 14 PRIOR ART
FIG. 14 is an exploded perspective view of a conventional isolator.

FIG. 13 shows a block diagram of the construction of a communication device. In each of the foregoing embodiments, an example in which the two-port isolator is constructed by incorporating the three-port circulator and the terminating resistor therein is shown. When an end of the line conductor 4*c*, which is connected to the chip resistor 8 shown in FIGS. 1 and 3, is an I/O terminal, the three-port circulator can be constructed. Port #1 of the circulator constructed in the above-described manner is connected to an output unit of a transmission circuit, port #2 thereof is connected to an antenna, and port #3 thereof is connected to an input unit of a reception circuit. Thus, the communication device is constructed, in which the circulator is used as a branching circuit for transmission and reception.

What is claimed is:

1. A method of manufacturing a non-reciprocal component comprising the steps of:

insert molding a casing and a lower yoke together such that a portion of said casing penetrates from an interior to an exterior of said lower yoke, and said lower yoke is disposed at a bottom face of said casing;

forming an input/output terminal and a ground terminal in said casing;

disposing a ferrie plate, a transmission line conductor, and a magnet in said casing; and disposing an upper yoke at a top face of said casing.

2. The method according to claim 1, wherein a portion of said lower yoke is exposed as said ground terminal from said casing.

3. The method according to claim 2, further comprising the steps of:

forming said ground terminal to protrude outside said lower yoke; and forming a solder resist film at a base of said ground terminal.

4. The method according to claim 2, wherein a side of said component is defined partly by said lower yoke and partly by said portion of said casing.

5. The method according to claim 1, further comprising the step of molding a hoop material so that respective portions of said molded hoop material define said input/output terminal and said ground terminal.

6. The method according to claim 5, wherein a portion of said lower yoke is exposed as said ground terminal from said casing.

7. The method according to claim 6, further comprising the steps of:

forming said ground terminal to protrude outside said lower yoke; and forming a solder resist film at a base of said ground terminal.

8. The method according to claim 6, wherein a side of said component is defined partly by said lower yoke and partly by said portion of said casing.

9. The method according to claim 5, wherein a side of said component is defined partly by said lower yoke and partly by said portion of said casing.

10. The method according to claim 1, wherein a thickness of said lower yoke, a thickness of said input/output terminal, and a thickness of said ground terminal are each 0.3 mm or less.

11. The method according to claim 1, wherein a side of said component is defined partly by said lower yoke and partly by said portion of said casing.

* * * * *